United States Patent [19]

Chu et al.

[11] Patent Number: 5,319,266

[45] Date of Patent: Jun. 7, 1994

[54] DIFFERENTIAL BOXCAR INTEGRATOR WITH AUTO-ZERO FUNCTION

[75] Inventors: Ching Chu, Oakville; John Haywood, Burlington, both of Canada

[73] Assignee: Antel Optronics Inc., Burlington, Canada

[21] Appl. No.: 21,436

[22] Filed: Feb. 24, 1993

[51] Int. Cl.$^5$ .......................................... B11C 27/02
[52] U.S. Cl. ................................. 307/494; 307/353; 328/127
[58] Field of Search ............... 307/228, 311, 352, 359, 307/491, 353, 494; 328/127, 128, 151; 356/73.1

[56] References Cited

U.S. PATENT DOCUMENTS

| | | | |
|---|---|---|---|
| 3,864,583 | 2/1975 | Fiorino | 307/352 |
| 4,767,997 | 8/1988 | Nielsen | 328/151 |
| 5,036,289 | 7/1991 | Duran | 307/311 |
| 5,047,727 | 9/1991 | Theus | 307/491 |
| 5,057,682 | 10/1991 | Michon et al. | 307/311 |

Primary Examiner—Timothy P. Callahan
Assistant Examiner—Shawn Riley
Attorney, Agent, or Firm—Bereskin & Parr

[57] ABSTRACT

A switched boxcar integrating circuit suitable for use with high speed data acquisition systems such as an Optical Domain Reflectometer. The boxcar integrator comprises a differential pre-amplifier stage, a sampling switch, and an integrator. The sampling switch couples the output of the pre-amplifier to the input of the integrator. The integrator includes non-inverting and inverting stages for producing a differential integrated signal. The switch samples the output of the pre-amplifier. The samples are integrated by the integrator once a sufficient number have been acquired. The sampling switch includes a switch controller to synchronize the operation of the switch with the received signals. The integrator also includes an offset compensator and a reset switch which are coupled to the integrator. The offset compensator and reset switch set the integrator to zero and also correct any offset error. A feature of the boxcar integrator according to the present invention is the variable integrator aperture which allows the response of the receiver stage in an OTDR to be matched to the characteristics of the transmit stage.

7 Claims, 3 Drawing Sheets

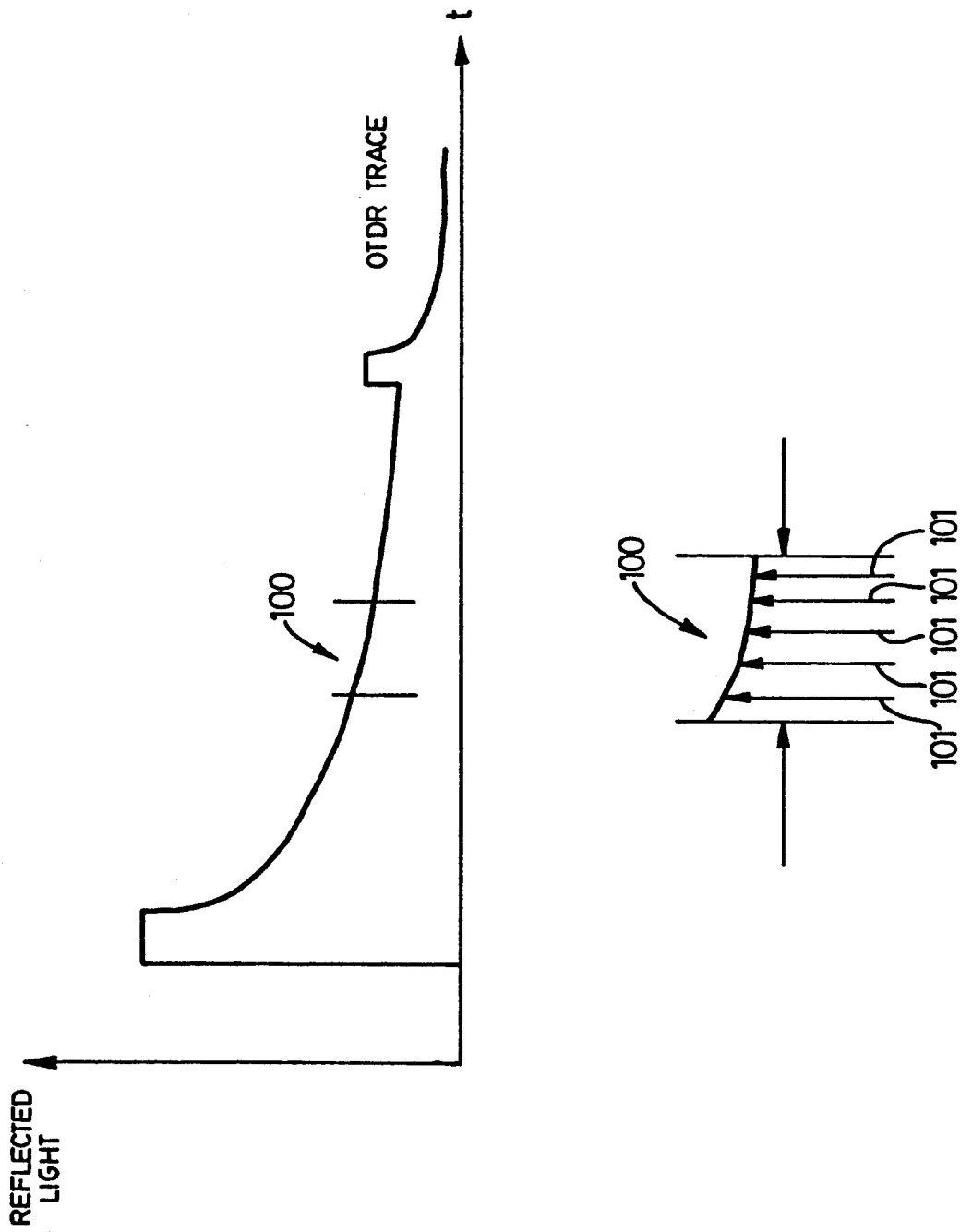

DIFFERENTIAL BOXCAR INTEGRATOR WITH AUTO-ZERO FUNCTION

FIELD OF THE INVENTION

The present invention relates to a boxcar integration circuit for use in data acquisition systems. More particularly, the present invention provides a differential boxcar integrator with an auto-zero function which is suitable for use in an optical time domain reflectometer system.

BACKGROUND OF THE INVENTION

The optical time domain reflectometer (OTDR) is an instrument which is used for measuring the attenuation and other characteristics of fibre optic cable. The OTDR sends light pulses into an optical fibre and measures the reflected and backscattered light. The principle advantages of the OTDR method are that the fibre cable does not have to be cut nor do both ends of the fibre cable have to be accessed.

The fibre characteristics and features along the cable will cause portions of the light pulse to be backscattered and reflected back to the OTDR. The OTDR has a photo detector which detects the backscattered and reflected light. The OTDR processes the signals from the photodetector to create a waveform which shows the characteristics and features of the fibre as a function of time. The waveform is then displayed on a monitor as a function of distance along the length of the cable.

The OTDR system can use a range of optical pulse widths to probe and test the fibre cable. In an OTDR system, an optical pulse with a greater width provides superior distance and dynamic range, while an optical pulse with a narrow width provides superior distance resolution. It will be appreciated that a narrow pulse width provides increased resolution for the OTDR at the expense of distance or dynamic range because less energy is sent into and received from in the cable.

The dynamic range and resolution of an OTDR instrument are the two most important specifications. To achieve superior performance, an OTDR must be capable of providing high dynamic range and distance resolution.

The problem is existing OTDR systems is the matching of the receiver frequency response to the varying pulse widths of the transmitter stage. To maximize the efficiency and accuracy of the data acquisition, the receiver must be able to respond to the varying optical pulse widths which can be generated by the transmitter stage. Another problem in existing OTDR systems occurs when a reflected light pulse having a large amplitude (e.g. reflection at connector) saturates the input amplifier and thereby prevents the detection of backscattered light which immediately follows the period of time between saturation and recovery of the amplifier. This is commonly known as the "dead-zone".

Another problem in practical OTDR systems is noise associated with electromagnetic interference. The signals present in the receiver stage of an OTDR are very wide bandwidth and very low level, and therefore the circuit is susceptible to noise which can degrade the dynamic range of the OTDR.

BRIEF SUMMARY OF THE INVENTION

The present invention provides a switched boxcar integrator comprising: (a) an input stage for receiving the input signal; (b) sampling means for sampling the input signal, said sampling means being coupled to said input stage and having an output port, and including switching means for producing at said output port a sampled signal corresponding to the input signal; and (c) integrator means for integrating said sampled signal, said integrator means including an input coupled to said output port and a signal output for outputting an integrated signal corresponding to the input signal.

The switched boxcar integrator features a variable integration aperture which allows the integrator to sample an incoming signal with a minimum bandwidth while preserving a finite impulse response. The variable integrator aperture feature also has the advantage of reducing the "dead-zone" which can occur during data acquisition in an OTDR system.

Another advantage of the present invention is a differential configuration which provides good common noise rejection. The common mode rejection ratio (CMRR) is very important in the circuit design of an OTDR system because of the high frequency signals present and the resulting radio frequency interference.

Further features and advantages of the present invention will appear from the following description taken together with the accompanying drawings.

BRIEF SUMMARY OF THE DRAWINGS

For a better understanding of the present invention, and to show more clearly how it may be carried into effect, reference will now be made, by way of example, to the accompanying drawings in which:

FIG. 3 shows in diagrammatic form the variable integrator aperture feature of the differential boxcar integrator of FIG. 1.

DETAILED DESCRIPTION OF THE PREFERRED EMBODIMENTS

Figure 1:
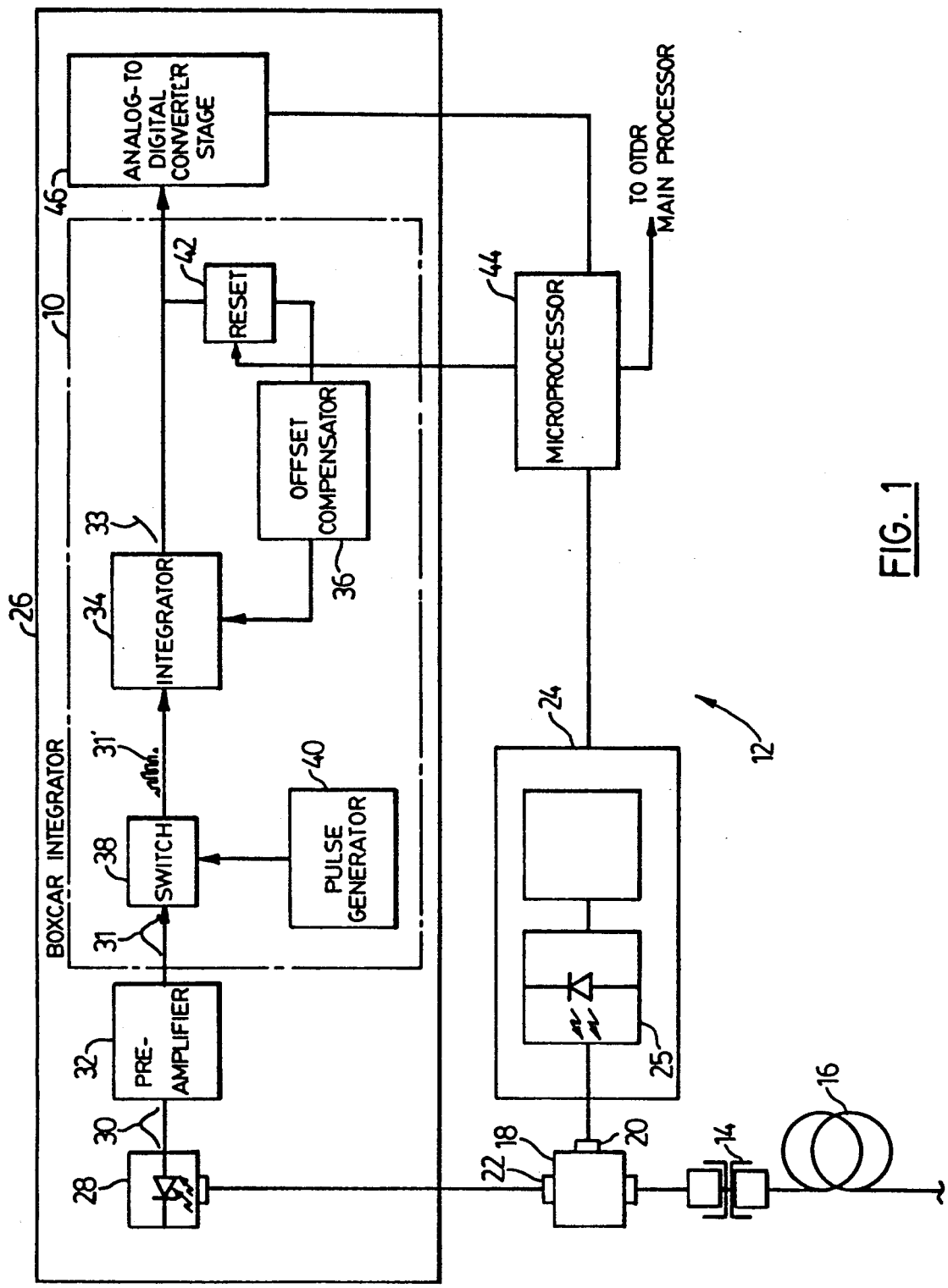
FIG. 1 shows in block diagram form a differential boxcar integrator according to the preferred embodiment of the present invention.

FIG. 1 shows in block diagram form a differential boxcar integrator 10, which is suitable for use in an Optical Time Reflectometer (OTDR) system. In a typical OTDR system, the boxcar integrator 10 is part of the fiber interface module indicated by reference 12.

The interface module 12 has a fiber coupler 14 which couples the OTDR to the end of a fiber cable 16 which is to be tested by the OTDR. The other side of the fiber coupler 14 is connected to a fiber splitter 18. The fiber splitter 18 provides the coupler 14 with two ports 20,22. The first port 20 couples the fiber 16 to a transmitter stage 24. The transmitter stage 24 includes a laser diode 25 which is used to inject light pulses into the end of the fiber cable 16.

The other port 22 of the fiber splitter 18 is coupled to a receiver stage 26. The receiver stage 26 has a photodetector 28 (e.g. avalanche photodiode) which converts the reflected and backscattered light into an electrical current signal 30. (Features along the distance of the fiber cable 16 cause portions of the light pulse generated by the laser diode 25 to be reflected and backscattered back to receiver stage 26).

The receiver stage 26 includes a (pre-)amplifier 32 which is coupled to the output of the photodetector 28. The function of the pre-amplifier 32 is amplify the electrical signal 30 to a level sufficient for further signal processing. In known OTDR systems (not shown), the amplifier in the receiver stage has a high gain in order to amplify the signal to a sufficient level for analog-to-digital conversion. It is a feature of the present invention that the receiver stage 26 uses a pre-amplifier 32 with a low-gain and the signal 30 is integrated using the differential boxcar integrator 10 prior to analog-to-digital conversion and further signal processing. By using an amplifier 30 with a low gain (i.e. pre-amplifier) the problem of "dead-zone" response in the OTDR can be eliminated as will be discussed in more detail below.

In the preferred embodiment of the present invention, the amplifier 32 is a transimpedance amplifier which in known manner converts an input current into an output voltage signal. In FIG. 1, the pre-amplifier 32 converts the electrical current signal 30 into a voltage signal 31 at its output.

As shown in FIG. 1, the differential boxcar integrator 10 according to the present invention comprises an integrator stage 34, an offset compensator stage 36, and a sampling switch 38. The output of the switch 38 is coupled to the input of the integrator stage 34. The sampling switch 38 is controlled by a pulse generator 40. The offset compensator stage 36 is coupled between the output and input of the integrator stage 34.

To clear the integrator stage 34, there is a reset switch 42 which is coupled to a microprocessor 44. The microprocessor 44 is also coupled to an analog-to-digital converter 46 which digitizes the output from the integrator stage 34. In the preferred embodiment of the present invention, the microprocessor 44 controls the operation of the receiver module 26 as will be explained below.

The operation of the boxcar integrator 10 according to the present invention can be explained as follows. During normal operation, the sampling switch 38 is closed periodically by the pulse generator 40. The pulse generator 40 synchronizes the closing of the sampling switch 38 with the current signal 30, i.e. reflected and backscattered light received by the photodetector 28. The closing of the sampling switch 38 produces sampled voltage signals 31' which correspond to the voltage signal 31. The integrator stage 34 takes a sufficient number of the sampled voltage signals 31' and integrates them to produce an integrated voltage signal 33. The resultant integrated voltage signal 33 is then digitized by the analog-to-digital converter 46.

Before another integrated voltage signal 33 can be produced (i.e. sampled voltage signals 31' acquired and integrated), the integrator stage 34 must be cleared or set to zero. The integrator 34 is cleared by closing the reset switch 42 which is under the control of the microprocessor 44. When the reset switch 42 is closed, the integrating capacitors (see FIG. 2) in the integrator stage 34 are discharged.

Figure 2:
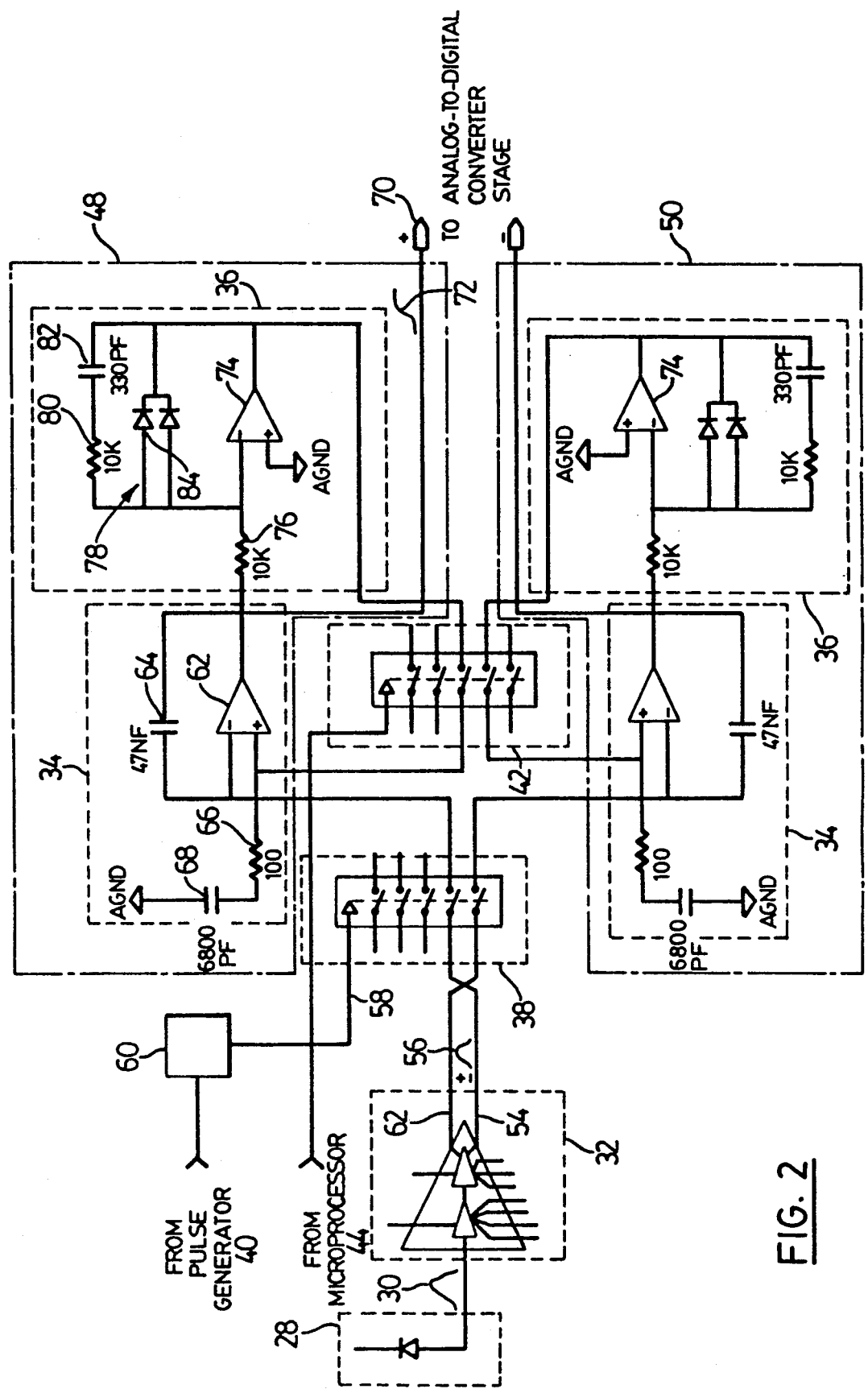
FIG. 2 shows in schematic form the differential boxcar integrator of FIG. 1.

Reference will next be made to FIG. 2 which shows in schematic form a practical implementation of the differential boxcar integrator 10 of FIG. 1. In the preferred embodiment, the boxcar integrator 10 is implemented as a differential integrator having a non-inverting stage 48 and an inverting stage 50. In the following discussion, the non-inverting stage 48 will be described, keeping in mind that the description is equally applicable to the inverting stage 50 which is identical in structure to the non-inverting stage 48.

The pre-amplifier 32 is preferably a transimpedance amplifier having differential outputs: a non-inverting output 52 and an inverting output 54. The differential outputs 52,54 provide the differential signal inputs to the respective non-inverting and inverting stages 48,50. A suitable commercially available transimpedance amplifier is the NE/SA5211 amplifier manufactured by Signetics Corporation. The NE/SA5211 provides a trans-resistance of 28 kV/A, a bandwidth of 180 megahertz, differential outputs (i.e. non-inverting output 52 and inverting output 54).

It will be appreciated by those skilled in the art that a differential configuration provides the advantage of common mode rejection or CMRR. The CMRR can be quite important in an OTDR application because of the high bandwidth of the signals being processed.

Another feature of the present invention is the low level amplification (i.e. 28 kV/A) of the electrical current 30 produced by the photodetector 28. Because of the low gain of the pre-amplifier 32, noise in the interface module 12 must be eliminated or at least minimized to maintain the integrity of the signal 30. An immediate advantage of using a low-gain pre-amplifier 32 is that the problem of a "dead-zone" in the OTDR can be reduced. Those skilled in the art will know that "dead-zone" results when the input amplifier becomes saturated by a high amplitude signal from the photodetector, as a result of a reflection for example. A "dead-zone" results because the saturated amplifier cannot respond to a subsequent signal with a small amplitude (e.g. a signal indicating Rayleigh backscatter) until the amplifier has recovered from the high amplitude signal. In known OTDR systems, the dead-zone is typically specified in terms of distance, for example, 10 meters.

In the present invention, the amplifier is implemented using a pre-amplifier 32 instead of a high gain amplifier as in known OTDR systems. By choosing a pre-amplifier 32 having high-sensitivity to low-level signals, saturation is avoided and the resultant dead-zone reduced.

Another feature of the present invention, involves sampling the output of the pre-amplifier stage 32. The sampling (and integration) of the output of the pre-amplifier 32 permits low-level signals 30 to be processed and accurately reproduced through the analog-to-digital converter 46. Furthermore, according to the present invention, direct sampling of the output of the photodetector 28 could be achieved using a sampling switch 38 which introduced very little noise.

Referring back to FIG. 2, the transimpedance amplifier produces a differential voltage output signal 56 on the outputs 52,54 in response to the current generated through the conversion of the photons (not shown) received by the photodetector 28 (i.e. avalanche photodiode). Because of inversion by the integrator 36 in each of the stages 48,50, the non-inverted output 52 of the pre-amplifier 32 is the input to the inverting stage 50 and the inverted output 54 is the input to the non-inverting stage 52.

The sampling switch 38 couples the differential outputs of the pre-amplifier 32 to the non-inverting and inverting integrator stages 48,50 respectively. A suitable commercially available component for the sampling switch 38 is the QS54/74QST3384 which is manufactured by Quality Semiconductor Inc. The 3384QST is a high speed CMOS bus switch which features very low on resistance and propagation delay.

The function of the sampling switch 38 is to sample the respective output 52 or 54 when the switch 38 is closed. The switch 38 includes a switch enable input 58 to control the closing and opening of the switch 38. According to the preferred embodiment of the present invention, the switch enable input 58 is coupled to the pulse generator 40. The pulse generator 40 also drives the laser diode 25 in the transmitter stage 24. The light pulses produced by the laser diode 25 are reflected and backscattered according to the features of the fiber 16 under test. Therefore to synchronize the switch 38 with the light pulses from the laser diode 25 (which produce the electrical current signal 30), the switch enable input 58 is coupled to the pulse generator through a delay generator 60.

Referring to FIG. 2, the non-inverting stage 48 includes the integrator 34 and the offset compensator 36. The integrator 34 comprises an operational amplifier 62 having an integrating capacitor 64. The integrating capacitor 64 is connected between the inverting input and the output of the operational amplifier 62 to form a negative feedback loop. The non-inverting input of the operational amplifier 62 is connected to ground through a resistor 66 and small capacitor network 68 to improve the noise immunity and stability of the integrator 34. The inverting input of the operational amplifier 62 is coupled to the output of the switch 38 which in turn is connected to the inverting output 54 of the pre-amplifier 32. The operational amplifier 62 produces at its output 70 a signal 72 which corresponds to the integrated inverted component of the signal 56 that was sampled by the sampling switch 38. Before another sampled signal 31' can be integrated the integrator 34 must be reset or zeroed.

The output 70 of the operational amplifier 62 (i.e. integrator 34) is connected to the offset compensator 36. The function of the offset compensator 36 is to reset the integrator 34 and to zero any offset (i.e. the voltage difference between the non-inverting and inverting inputs of the operational amplifier 62).

The offset compensator 36 is coupled to the output 70 of the operational amplifier 62. The compensator 62 also comprises an operational amplifier 74. The inverting input of the operational amplifier 74 is connected to the output 70 through a resistor 76. The non-inverting input is connected to ground.

The operational amplifier 74 also includes a forward phase shift network 78 in the negative feedback loop. The function of the phase shift network 78 is to provide a forward phase shift to compensate for the negative phase shift caused by the integrating capacitor 64. The phase shift network 78 comprises a resistor 80, a capacitor 82 and a diode 84. The resistor 80 and a capacitor 82 are series connected between the inverting input and the output of the operational amplifier 74. The diode 84 is also connected between the inverting input and the output of the operational amplifier 74. The diode 84 prevents negative voltages on the output of the amplifier 74; and the resistor 80 and capacitor 82 provide the forward phase shift.

To reset the integrator 34 and zero any offset, the offset compensator 36 works in conjunction with the sampling switch 38 and the reset switch 42. To reset the integrator 34, the reset switch 42 and sampling switch 38 are closed. In the preferred embodiment, the microprocessor 44 controls the reset switch 42 and the sampling switch 38 (indirectly through the pulse generator 40). When the reset switch 42 is closed, the operational amplifier 74 generates an error signal (not shown) which is fed back to the non-inverting input of the operational amplifier 62 in the integrator 34 through the closed reset switch 42. The error signal is the difference between the output of the operational amplifier 62 (i.e. integrator 34) and the signal at the non-inverting input of the operational amplifier 62 (with respect to ground).

The error signal fed back to the operational amplifier 62 stabilizes when the output of the operational amplifier 62 has been returned to zero. When this condition has been reached, the voltage at the non-inverting input of the operational amplifier 62 will be at a level which corresponds to the voltage reference relative to which the operational amplifier 62 integrates, as will be understood by one skilled in the art. By definition, this voltage reference is the output voltage signal 31 of the pre-amplifier minus any offset voltage in the operational amplifier 62. Therefore, the integrator 34 (i.e. operational amplifier 62) has been reset and the reference voltage of the integrator 34 has been set to reflect the offsets in both the pre-amplifier 32 (i.e. transimpedance amplifier) and the integrating operational amplifier 62.

A suitable component for the operational amplifiers 62,74 in the integrator 34 and offset compensator 36 is the LF412A which is manufactured by National Semiconductor Corporation. The LF412 devices provide low cost and high speed JFET input operational amplifiers which have very low input offset voltage.

Reference is next made to FIG. 3 which shows in diagrammatic form the variable integrator aperture feature of the boxcar integrator 10. In a typical OTDR application, the variable integrator aperture indicated by reference 100 has a range of 10 nanoseconds to 10 microseconds. The sampling frequency, i.e. rate of closing and opening the switch 38, is in the range 1 kiloHertz to 10 kiloHertz and indicated in FIG. 3 by arrows 101. It will be evident to skilled in the art that the width of integrator aperture 100 can be varied according to the width of the light pulse generated by the laser diode 25 in the transmit stage 24. The width of the integrator aperture 100 is controlled by the operation of the reset switch 42 which is coupled to the microprocessor 44, as described above. Under the control of the microprocessor 44, the width of the aperture 100 can be determined by the reset switch 42 and the number of samples 101 (i.e. resolution) within the aperture is controlled by the switch 38. Therefore the present invention provides a variable integrator aperture which allows the response of the receiver stage 26 to be matched to the response of the transmit stage 24. In other words, the aperture or sampling window can be optimized for narrow (high resolution) light pulses or wide (high bandwidth) light pulses which are injected are into the fiber 16 by the transmit stage 24.

It will be evident to those skilled in the art that other embodiments fall within the scope of the present invention as defined by the following claims.

We claim:

1. A boxcar integrator for integrating an input signal, said integrator comprising:
    (a) an input stage for receiving the input signal and including means for producing a differential signal output having an inverted component and a non-inverted component;
    (b) sampling means for sampling said differential signal output, said sampling means being coupled to said input stage and having an output port, and including switching means for simultaneously producing at said output port a sampled inverted signal component and a sampled non-inverted signal component; and
    (c) integrator means for integrating said sampled inverted signal component and said sampled non-inverted signal component said integrator means including an input port for receiving said sampled inverted and non-inverted signal components and a differential signal output port and means for producing a differential integrated signal at said output port corresponding to the input signal.

2. The boxcar integrator claimed in claim 1, wherein said means for producing a differential signal output comprises a transimpedance amplifier, said transimpedance amplifier having an input for receiving the input signal and a differential output and means for producing said inverted and non-inverted signal components at said differential output, said differential output being coupled to said sampling means.

3. The boxcar integrator claimed in claim 1 or 2, wherein said integrator means includes a non-inverting integrator stage and an inverting integrator stage, said non-inverting and inverting integrator stages comprising a differential integrator having a differential signal output port, and said non-inverting stage having an input for receiving said sampled inverted signal component and means for producing a positive integrated signal component at said differential signal output port and said inverting stage having an input for receiving said sampled non-inverted signal component and means for producing a negative integrated signal component at said differential signal output port.

4. The boxcar integrator claimed in claim 2, further including offset correction means for generating an offset control signal for said integrator means, said offset correction means being coupled between the input and signal output of said integrator means.

5. The boxcar integrator claimed in claim 4, wherein said offset correction means includes switch means for injecting said offset control signal into said integrator means, said switch means having an output coupled to said integrator means and including switching means for producing said offset signal at said output.

6. The boxcar integrator claimed in claim 4 or 5, wherein said sampling means includes control means for controlling the operation of said switching means.

7. A boxcar integrator for use with an optical time domain reflectometer, said boxcar integrator comprising:
   (a) an input stage for receiving an input signal and including a transimpedance amplifier for producing a differential signal output having an inverted component and a non-inverted component;
   (b) sampling means for sampling said differential signal output, said sampling means being coupled to said input stage and having an output port, and including switching means for simultaneously producing at said output port a sampled inverted signal component and a sampled non-inverted signal component corresponding to the input signal; and
   (c) integrator means for integrating said sampled inverted signal and said sampled non-inverted signal, said integrator means including an input port for receiving said sampled inverted and non-inverted signal components and a differential signal output port and means for producing a differential integrated signal at said output port; and
   (d) said integrator means including a non-inverting integrator stage and an inverting integrator stage, said non-inverting and inverting integrator stages comprising a differential integrator having a differential signal output port, and said non-inverting stage having an input for receiving said sampled inverted signal component and means for producing a positive integrated signal component at said differential signal output port and said inverting stage having an input for receiving said sampled non-inverted signal component and means for producing a negative integrated signal component at said differential signal output port.

* * * * *